(12) United States Patent
Miyamoto et al.

(10) Patent No.: US 7,054,718 B2
(45) Date of Patent: May 30, 2006

(54) MOTION EDITING APPARATUS AND METHOD FOR LEGGED MOBILE ROBOT AND COMPUTER PROGRAM

(75) Inventors: Atsushi Miyamoto, Kanagawa (JP); Tatsuo Mikami, Kanagawa (JP); Jinichi Yamaguchi, 5-14-38, Tamadaira, Hino-shi, Tokyo (JP)

(73) Assignees: Sony Corporation, Tokyo (JP); Jinichi Yamaguchi, Tokyo (JP)

( * ) Notice: Subject to any disclaimer, the term of this patent is extended or adjusted under 35 U.S.C. 154(b) by 194 days.

(21) Appl. No.: 10/681,881

(22) Filed: Oct. 9, 2003

(65) Prior Publication Data

US 2004/0128028 A1 Jul. 1, 2004

(30) Foreign Application Priority Data

Oct. 11, 2002 (JP) ............................. 2002-298348

(51) Int. Cl.
G05B 15/00 (2006.01)
G05B 19/00 (2006.01)

(52) U.S. Cl. ..................... 700/258; 700/245; 901/1; 180/8.1; 318/568.12

(58) Field of Classification Search .............. 700/245, 700/246, 250, 254, 260, 261, 262; 318/568.12, 318/568.15; 901/1, 2; 180/8.1, 8.6; 701/23
See application file for complete search history.

(56) References Cited

U.S. PATENT DOCUMENTS

| 4,843,566 | A | * | 6/1989 | Gordon et al. ............... 700/250 |
| 5,355,064 | A | * | 10/1994 | Yoshino et al. ........ 318/568.12 |
| 5,936,367 | A | * | 8/1999 | Takenaka ............... 318/568.12 |
| 6,580,969 | B1 | * | 6/2003 | Ishida et al. ................. 700/245 |
| 6,584,377 | B1 | * | 6/2003 | Saijo et al. .................... 700/245 |
| 6,697,709 | B1 | * | 2/2004 | Kuroki et al. ............... 700/245 |
| 6,714,201 | B1 | * | 3/2004 | Grinstein et al. ........... 345/474 |
| 6,832,131 | B1 | * | 12/2004 | Hattori et al. ............... 700/245 |
| 6,832,132 | B1 | * | 12/2004 | Ishida et al. ................. 700/245 |
| 6,898,485 | B1 | * | 5/2005 | Kuroki et al. ............... 700/245 |
| 6,901,313 | B1 | * | 5/2005 | Mori et al. ................... 700/245 |

OTHER PUBLICATIONS

Hirai et al., The development of Honda humaoid robot, 1998, IEEE, p. 1321-1326.*
Danehiro et al., Virtual humanoid robot platform to develop controllers of real humanoid robots without porting, 2001, IEEE, p. 1093-1099.*

* cited by examiner

*Primary Examiner*—Richard M. Camry
*Assistant Examiner*—McDieunel Marc
(74) *Attorney, Agent, or Firm*—Frommer Lawrence & Haug LLP; William S. Frommer; Thomas F. Presson

(57) ABSTRACT

A motion editing system for a robot in which the motion of a robot edited is corrected as the movements performed by an actual robot are checked. An optional range of motion data is reproduced using an actual robot. At this time, an output from each sensor mounted to the actual robot, that is, the sensor information, is transmitted to the motion editing system. The robot's movements are evaluated on the motion editing system based on the sensor information acquired during motion reproduction. If, as a result of the robot's movements, a predetermined evaluation criterium is not met, the motion correction processing is carried out. If the predetermined evaluation criterium is met, a motion data file, in which is embedded the reference sensor information, is formulated.

37 Claims, 13 Drawing Sheets

| TIME | R_Waist_Pitch | M_Waist_Pitch | R_Waist_Roll | M_Waist_Roll | R_Right_Shoulder_Pitch | M_Right_Shoulder_Pitch |
|---|---|---|---|---|---|---|
| 0 | 1.3 | 1.06294 | 0 | 0.021973 | | 5.625 |
| 0.010 | 1.3 | 1.06294 | 0 | 0.016479 | | 5.625 |
| 0.020 | 1.3 | 1.068433 | 0 | 0.32959 | | 5.625 |
| 0.030 | 1.3 | 1.06294 | 0 | 0.32959 | | 5.635987 |
| 0.040 | 1.3 | 1.06294 | 0 | 0.016479 | | 5.625 |

<JOINT NAMES>
Waist_Pitch:                WAIST JOINT PITCH AXIS
Waist_Roll:                 WAIST JOINT ROLL AXIS
Right_Shoulder_Pitch:       RIGHT SHOULDER JOINT PITCH AXIS

FIG.6

| TIME | R_PelvisAccelX | M_PelvisAccelX | M_PelvisACAccelX | F_PelvisACAccelX | R_PelvisGyroRoll | R_PelvisGyroRoll |
|---|---|---|---|---|---|---|
| 0 | 0.0 | -0.136172 | 0.000143 | 0.000143 | 0.0 | 0.010594 |
| 0.010 | 0.0 | -0.134975 | 0.000143 | 0.000143 | 0.0 | 0.010594 |
| 0.020 | 0.0 | -0.139764 | 0.000143 | 0.000143 | 0.0 | 0.011169 |
| 0.030 | 0.0 | -0.140961 | -0.153087 | -0.153087 | 0.0 | 0.010594 |
| 0.040 | 0.0 | -0.143355 | -0.153087 | -0.153087 | 0.0 | 0.011169 |

<SENSOR NAMES>
PelvisAccelX: X-AXIS PELVIS UNIT ACCELERATION SENSOR VALUE
PlvisACAccelX: X-AXIS PELVIS UNIT ACCELERATION SENSOR AC VALUE (ALTERNATING CURRENT COMPONENT)
PelvisGyroRoll: RIGHT SHOULDER JOINT PITCH AXIS

FIG.7

| TIME | R_RightFootZMPX | M_RightFootZMPX | R_RightFootZMPY | M_RightFootZMPY |
|---|---|---|---|---|
| 0 | 0.0 | -0.005918 | 0.0 | -0.027209 |
| 0.010 | 0.0 | -0.005918 | 0.0 | -0.027209 |
| 0.020 | 0.0 | -0.005918 | 0.0 | -0.027209 |
| 0.030 | 0.0 | -0.005918 | 0.0 | -0.027209 |
| 0.040 | 0.0 | -0.005918 | 0.0 | -0.027209 |

<NAME OF ZMP TRAJECTORIES>
RightFootZMPX: X-AXIS RIGHT FOOT ZMP TRAJECTORY
RightFootZMPY: Y-AXIS RIGHT FOOT ZMP TRAJECTORY

FIG.8

| TIME | R_RightFootCNT | M_RightFootCNT | R_RightFootFZ |
|---|---|---|---|
| 0 | 15 | 15 | 33.932476 |
| 0.010 | 15 | 15 | 34.004326 |
| 0.020 | 15 | 15 | 34.004326 |
| 0.030 | 15 | 15 | 33.941456 |
| 0.040 | 15 | 15 | 34.004326 |

<TOUCHDOWN INFORMATION>
RightFootCNT: RIGHT FOOT TOUCHDOWN
RightFootFZ: RIGHT FOOT FLOOR REACTION FORCE

FIG.9

MOTION EDITING APPARATUS AND METHOD FOR LEGGED MOBILE ROBOT AND COMPUTER PROGRAM

BACKGROUND OF THE INVENTION

1. Field of the Invention

This invention relates to a motion editing apparatus and a motion editing method for supporting the creation and the editing of motions, stating a predetermined movement pattern of a robot, and to a computer program. This invention especially relates to a motion editing apparatus and a motion editing method for a legged mobile robot for doing various tasks by movable legs, and to a computer program.

More particularly, the present invention relates to a motion editing apparatus and a motion editing method for supporting the editing of a movement pattern, as feasibility of the movement pattern on an actual robot is scrutinized, and to a computer program. More specifically, the invention relates to a motion editing apparatus and a motion editing method for a legged mobile robot in which the motion as edited is checked on the actual robot, and a computer program.

The application claims priority of Japanese Patent Application No. 2002-298348 filed on Oct. 11, 2002, the entirety of which is incorporated by reference herein.

2. Description of Related Art

A mechanical apparatus for performing movements simulating the movements of the human being, with the use of electrical or magnetic movements, is termed a "robot". The etymology of the term robot is said to be "ROBOTA" (slave machine) of the Slavic language. In Japan, the robots started to be used towards the end of the 1960s. Most of these robots used were industrial robots, such as manipulators or transporting robots, aimed to automate or perform unmanned tasks in plant movements.

In recent years, researches and developments in legged mobile robots, simulating the bodily mechanism and movements of an animal which is erected and walks on two feet, such as human beings or monkeys, are progressing, such that there are good prospects for practical utilization of this robot type. The movement system by legs, erected and walking on two legs, is labile as compared to the crawler type system or the system walking on four or six legs, and hence is difficult to control as to posture or walking. However, the movement system by legs, erected and walking on two legs, is favorable in such respects that it is able to cope with a work route presenting an irregular walking surface, such as non-leveled terrain or obstacles, or a non-continuous walking surface, such as staircase or ladder, thereby achieving more flexible movements.

On the other hand, the legged mobile robot, regenerating the mechanism of the living body or movements of the human beings, is termed a "humanoid" or a "humanoid robot". The humanoid robot is able to support the human life, that is to support human activities, in various aspects of our everyday life, such as in our living environments.

The major portions of the task space or the living space of the human beings are tailored to the bodily mechanism and the behavior patterns of the human beings, which are erect and walk on two feet, while presenting many obstacles to movements of the state-of-the-art mechanical system, having wheeled driving device or the like as movement means. Thus, in order for the mechanical system, that is, the robot, to take the place of the human beings in a large variety of tasks and to adapt itself to the living environment of the human beings, it is desirable that the possible range of movement of the robot is substantially the same as that of the human beings. This accounts for great general expectations for practical utilization of legged mobile robots.

The up-to-date legged mobile robot has a high information processing capability, such that the robot itself may be comprehended as a sort of the computer system. Stated differently, the highly advanced complicated sequence of movements, or motions, constructed by movement patterns, realized on a robot, or by a combination of plural fundamental movement patterns, are constructed by a movement similar to computer programming.

In order for the robot body to come into widespread use, it is imperative that a large number of motion data for actuating the robot body become practically usable. Thus, it is strongly desired to construct a development environment for enabling motion editing for robots.

It may also be anticipated that the robot will be widely used in the near future not only in industry but also in households and in our everyday life. In particular, as to an entertainment-oriented product, it may be anticipated that general consumers at large, not having specialized knowledge about computers or computer programming, purchase and use robots. For the general consumers at large, it would be desirable to provide a tool which will support them in formulating and editing the robot's movement sequence by interactive processing, that is, a motion editing system efficiently and with relative ease.

The robot is constructed by a plural number of control points, such as joints, so that, by sequentially inputting the positions or velocities (joint angles or angular accelerations) at respective control points, it is possible to edit the movements of the robot body. In this respect, the movement of such formulation and editing may be likened to the generation of character animation in computer graphics. However, there is an explicit difference between the movement in a virtual space and those of an actual apparatus (robot). In the case of the legged mobile robot, desired movements cannot be executed by simply actuating the angles of joints, such that the movements on legs need to be continued without falldown of the robot. In other words, in order to realize a desired movement, it is imperative that the movements realized on the actual robot are checked and stability in posture of the robot body is maintained in the course of the motion execution.

In controlling posture stability of the legged mobile robot, a ZMP stability decision criterium of searching for a zero moment point on or inwardly of a side of a supporting polygon, formed by the for sole touchdown point and the road surface, is used. In the case of the two-legged mobile robot, this supporting polygon is of a marked height, as a result of which it is retained to be difficult to control the posture of the robot in stability.

There has already been known a motion editing system in which command values in each control point of the robot body is entered on a display to help implement the robot's motion. However, there lacks up to now a system in which posture stability in case of realizing the edited motion is checked on the actual robot or in which the desired motion is corrected for stabilizing the posture. In fact, motion edition would be a failure if the posture stability of the robot body cannot be maintained with the implemented motion, such that the motion itself cannot be put into practice.

SUMMARY OF THE INVENTION

It is therefore an object of the present invention to provide a method and an apparatus for a legged mobile robot and a computer program in which it is possible to support user in editing a movement pattern, as feasibility thereof on the actual apparatus (robot) is taken into account.

It is another object of the present invention to provide a method and an apparatus and a computer program for a legged mobile robot in which the motion once edited can be corrected as the actual movements are checked on the actual apparatus.

In one aspect, the present invention provides a motion editing apparatus or method for a legged mobile robot having a plurality of degrees of freedom in joints and a sensor for measuring an external environment, in which the apparatus or method comprises a data input unit or step of inputting motion data, a data reproducing step of reproducing the motion data on an actual apparatus, a sensor information acquisition unit or step of acquiring the sensor information from the sensor during the time when the motion data is being reproduced, a motion evaluation unit or step of evaluating the motion based on the acquired sensor information, and a motion correction unit or step of correcting the motion data based on the results of evaluation, and an motion editing apparatus for a legged mobile robot for carrying out the above motion editing method.

In the motion editing apparatus and method, according to the first aspect of the present invention, it is possible to formulate, by acquiring the sensor information of the actual robot by communication, the motion which takes the response of the actual robot into account. It is also possible to check the motion data, formulated in a reference environment, as to whether or not the actual robot operates as scheduled when the motion data is executed in an environment different from the reference environment, such as in the living environment.

The motion editing apparatus or method for the legged mobile robot of the first aspect of the present invention may further include a motion data outputting unit or step for embedding the sensor information acquired by the sensor information acquisition unit as reference data in the motion data which satisfy a criterium of evaluation in the motion evaluation unit, and for outputting the resulting motion data having the reference data embedded therein.

Even if robot movements stated in the motion data are the same, the sensor outputs differ in dependence on the outside environment or on the working environment. For example, if the walking pattern is the same, the sensor output value differs when the robot is walking on a road presenting a gradient, or on the labile road surface, such as on the gravel or on the thick-piled carpet. With the motion data having the reference sensor information embedded therein, such advantage may be derived that the motion data consistent with specified working environments (or the robot using configuration) can be stated.

The motion data outputting unit or step may output the information on the angles of joints, formed by the combination of angle command values for respective joints and measured values acquired on executing the motion, as the motion data having the reference data embedded therein. Or, the motion data outputting unit or step may output the posture information composed of the combination of the target values for the respective sensors at the time of motion edition, measured values at the time of motion execution and filtered values of the measured values of the sensor outputs as the motion data having the reference data embedded therein. Alternatively, the motion data outputting unit or step may output the ZMP trajectory information formed by the combination of the target ZMP trajectory for left and right foot soles at the time of editing and the ZMP trajectory following the correction by stabilization control at the time of execution of the motion, as the motion data having the reference data embedded therein. Still alternatively, the motion data outputting unit or step may output the foot sole touchdown information formed by the combination of a target value at the time of editing of a floor reaction sensor and a measured value thereof at the time of motion execution and/or the contact information as motion data having the reference data embedded therein.

The motion evaluation unit or step may chronologically evaluate followup characteristics on executing the motion on the actual apparatus.

The motion evaluation unit or step may chronologically acquire a torque value of an actuator and the number of revolutions on executing the motion on an actual robot body and compare the acquired data to a NT curve representing the actuator characteristics, in order to evaluate whether or not there is any movement which surpasses the limit torque of the actuator.

The motion evaluation unit or step may calculate a difference between posture sensor values and the ZMP trajectory as scheduled at the time of the motion edition, and sensor values and the ZMP trajectory as acquired on executing the motion on an actual robot body, in order to evaluate the posture.

The motion evaluation unit or step may calculate a difference between the posture at the time of motion edition and measured values obtained on executing the motion on the actual robot body, in order to evaluate the touchdown and/or contact.

The motion evaluation unit may calculate the degree of improvement in measured values as to the motion corrected by last and previous evaluation events, in order to evaluate the degree of achievement of correction.

The motion evaluation unit or step may calculate the effect of an impact due to contact with an outside object on an actuator torque, ZMP trajectory or on the acceleration, in order to evaluate the impact due to contact with the outside object.

The motion correction unit or step may correct a command angle value to the actuator based on the result of evaluation of response properties of the actuator and/or corrects control parameters of the actuator.

The motion correction unit or step may change the contents of a posture stabilization processing block based on the result of evaluation of the actuator torque.

The motion correction unit or step may change the contents of a posture stabilization processing block based on the result of evaluation of the touchdown and/or contact.

The motion correction unit or step may change the control of the posture stabilization processing block, as the contact with the outside object is taken into account, based on the result of evaluation of the impact due to contact with the outside object.

The motion reproducing unit or step may take out only an optional range of motion data, in order to reproduce the range thus taken out on the actual apparatus.

By taking out only an optional range of the motion data and reproducing the so taken out motion data on the actual apparatus (robot), in reproducing the motion data-on the actual apparatus, the motion editing movement may be improved in efficiency.

The data reproducing unit or step may set a start time point in motion data, calculate the dynamic posture at the start time point, generate a transient motion with the dynamic posture at the start time point as a terminal point, reproduce the motion on the actual apparatus using the transient motion, set a stop time point in the motion data, calculate the dynamic posture at the time point, generate a transient motion with the stop posture as a start point, and halt the movement of the actual apparatus using the transient motion.

It is noted that the motion is formed by chronological combination of two or more postures. When a dynamic motion (continuous dynamic movement), which positively and continuously employs the acceleration, it is impossible to execute the motion from an intermediate point to make the evaluation. According to the present invention, the reproduction and stop of the continuous dynamic movement as from an optional time point are enabled to reduce the time needed for motion evaluation significantly.

In a second aspect, the present invention provides computer program in a computer readable form executing the motion editing processing for a legged mobile robot having a plurality of degrees of freedom in joints and a sensor for measuring an external environment. The computer program comprises a data inputting step of inputting motion data, a data reproducing step of reproducing the motion data on an actual apparatus, a sensor information acquisition step of acquiring the sensor information from the sensor during the time when the motion data is being reproduced, a motion evaluation step of evaluating the motion based on the acquired sensor information, and a motion correction step of correcting the motion data based on the results of evaluation.

The computer program in the second aspect of the present invention has defined, in a computer readable form, a computer program which allows a preset processing to be implemented on a computer system. In other words, by having the computer program of the second aspect of the present invention installed on the computer system, concerted movements may be realized on the computer system, whereby the operation and effect comparable to those of the motion editing apparatus or method for the legged mobile robot according to the first aspect of the present invention may be achieved.

Thus, according to the present invention, there are provided a motion editing apparatus, a motion editing method and a computer program for a legged mobile robot supporting the editing of the movement pattern as the feasibility on the actual apparatus (robot) is taken into consideration.

According to the present invention, there are also provided a motion editing apparatus, a motion editing method and a computer program for a legged mobile robot capable of correcting the edited motion as the movement on the actual apparatus is checked.

Other objects, features and advantages of the present invention will become more apparent from reading the embodiments of the present invention as shown in the drawings.

BRIEF DESCRIPTION OF THE DRAWINGS

FIG. 6 shows a data structure of the information on the angles of joints contained in motion data.

FIG. 7 shows a data structure of the information on the posture contained in motion data.

FIG. 8 shows a data structure of the information on the ZMP trajectory contained in motion data.

FIG. 9 shows a data structure of the information on the contact of the foot sole on the floor contained in motion data.

DESCRIPTION OF THE PREFERRED EMBODIMENTS

Figure 1:
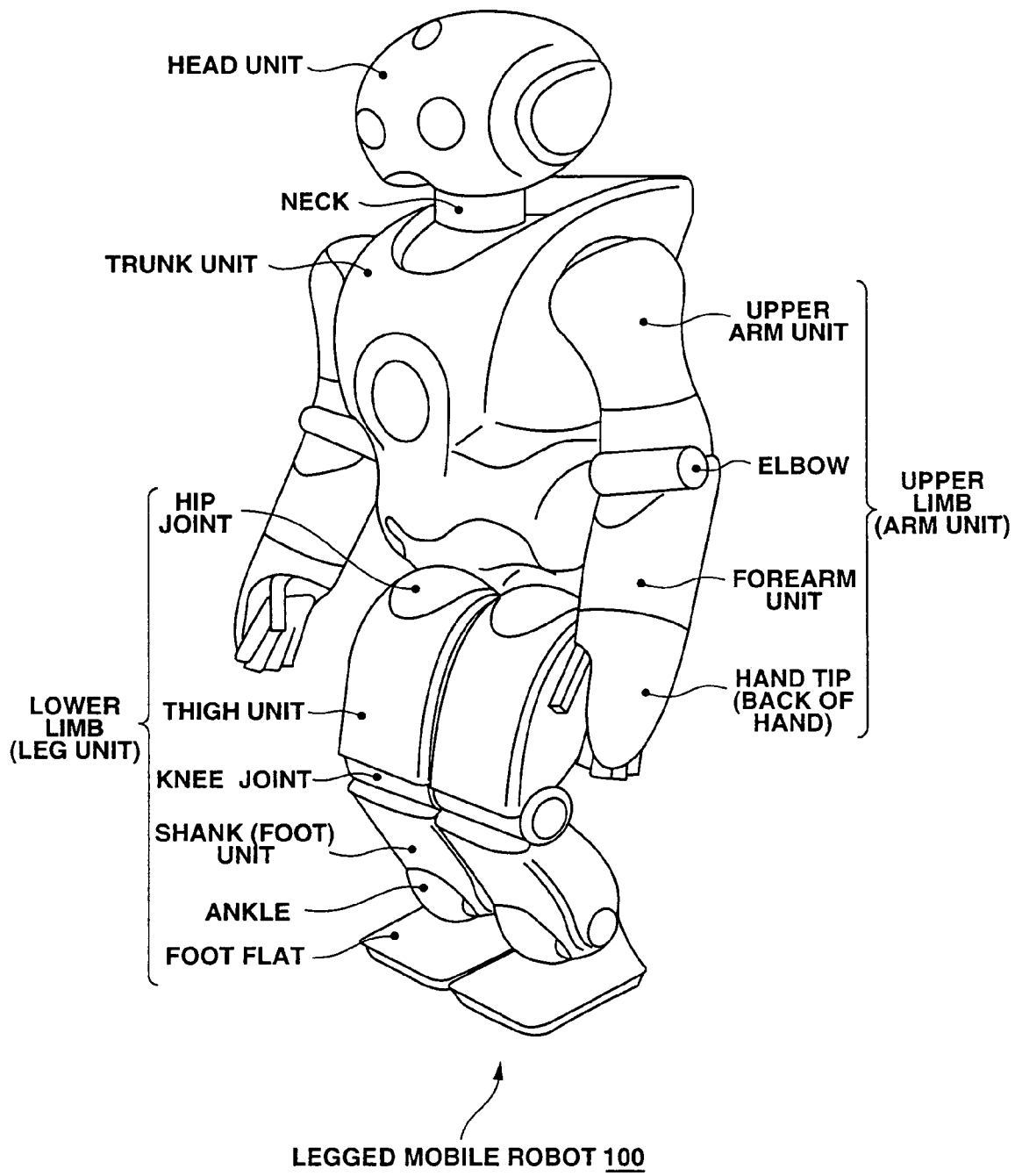
FIG. 1 shows an appearance and an overall structure of a legged mobile robot as a subject entity of motion edition by a motion editing system according to the present invention, looking from an oblique front side.

Referring to the drawings, a certain preferred embodiment of the present invention will be explained in detail.

A. Mechanical Structure of Legged Mobile Robot

Figure 2:
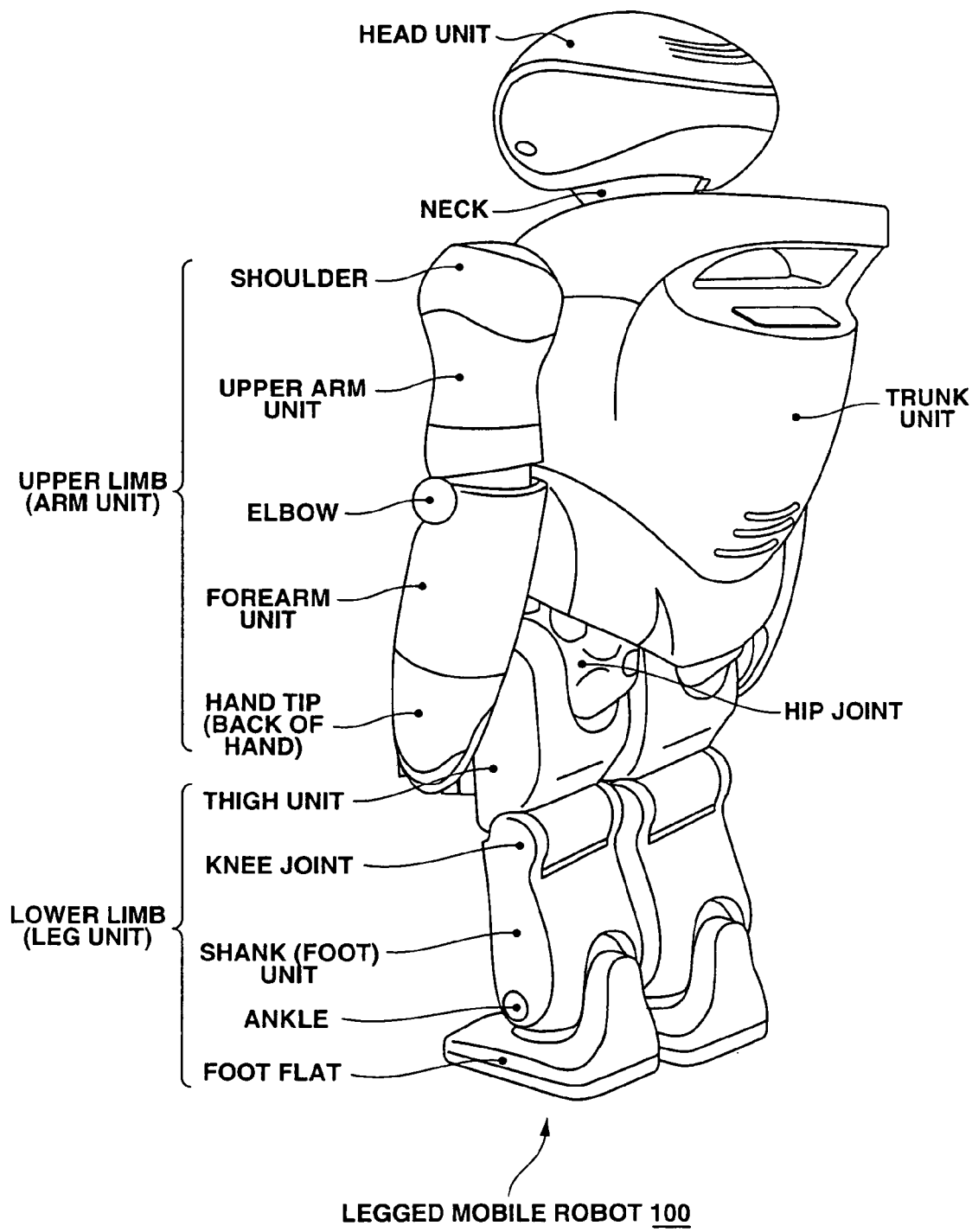
FIG. 2 shows an appearance and an overall structure of a legged mobile robot as a subject entity of motion edition by a motion editing system according to the present invention, looking from an oblique rear side.

FIGS. 1 and 2 show the appearance and the overall structure of the legged mobile robot 100 as a subject entity of motion edition by a motion editing system according to the present invention. This legged mobile robot is termed a "humanoid" robot. As shown, the legged mobile robot 100 is made up by a trunk unit, a head unit, left and right upper limbs and left and right lower limbs, responsible for movement on legs. The movements of the entire robot is comprehensively controlled by a controlling unit enclosed e.g. in its trunk portion (not shown).

Each of the left and right lower limbs is made up by a thigh unit, a knee joint, a shank unit, an ankle and a foot flat, and is connected to approximately the lowermost end of the body trunk unit by a hip joint. Each of the left and right upper limbs is made up by an upper arm, an elbow joint, and a forearm, and is connected to upper left and right side edges of the body trunk by the shoulder joint. The head unit is connected by the neck joint to approximately an uppermost mid point of the trunk portion.

The controlling unit is a casing on which there are mounted a controller (main controlling unit), taking charge of driving control of each joint actuator constituting the legged mobile robot 100, and of processing an external input from each sensor, as later explained, and peripherals, such as a power supply circuit. The controlling unit may also include a communication interface for remote control or communication devices.

The legged mobile robot 100, constructed as described above, is able to realize walking on two feet by concerted whole-body movement control by the controlling unit. This walking on two feet is usually realized by repetition of a walking period divided into the following respective movement periods:

(1) a period during which a right leg is uplifted, with the robot being supported on only the left leg;

(2) a period during which the right leg touches the floor, with the robot being supported on both legs;

(3) a period during which the left leg is uplifted, with the robot being supported on only the right leg; and (4) a period during which the left leg touches the floor, with the robot being supported on both legs.

The walking control in the legged mobile robot 100 may be achieved by planning a target trajectory of the lower limbs at the outset and by correcting the target trajectory during each of the above periods. That is, during the time period when the robot is supported by both legs, the correction of the lower limb trajectory is halted and, using the total correction quantity for the target trajectory, the waist height is corrected to a constant value. During the period when the robot is supported on the sole leg, a corrected trajectory is generated so that the position relationships between the ankle of the leg, the trajectory of which has been corrected, and the waist, will revert to the scheduled trajectory.

For posture stabilizing control for the robot body, to say nothing of the correction of the trajectory of the walking movements, interpolating calculations, employing a five-degree polynominal, are carried out in general in order to assure continuous transitions of the positions, velocity and the acceleration aimed to provide for a reduced offset with respect to the zero moment point (ZMP). This ZMP is used as a criterium for verifying the degree of walking stability.

This criterium for verifying the degree of walking stability by the ZMP is based on the [D-Alembert's principle] which states that the gravity and the force of inertia from the walking system to the road surface and the moment thereof are in equilibrium with the force of reaction from the floor as the reaction from the road surface to the walking system and the moment of the force of reaction from the floor. As a conclusion of the inference of mechanics, there exists a point of zero moment of the pitch and roll axes, that is the zero moment point (ZMP), on or inwardly of a side of a supporting polygon defined by the touchdown point of the foot sole and the road surface (ZMP stabilized area).

Figure 3:
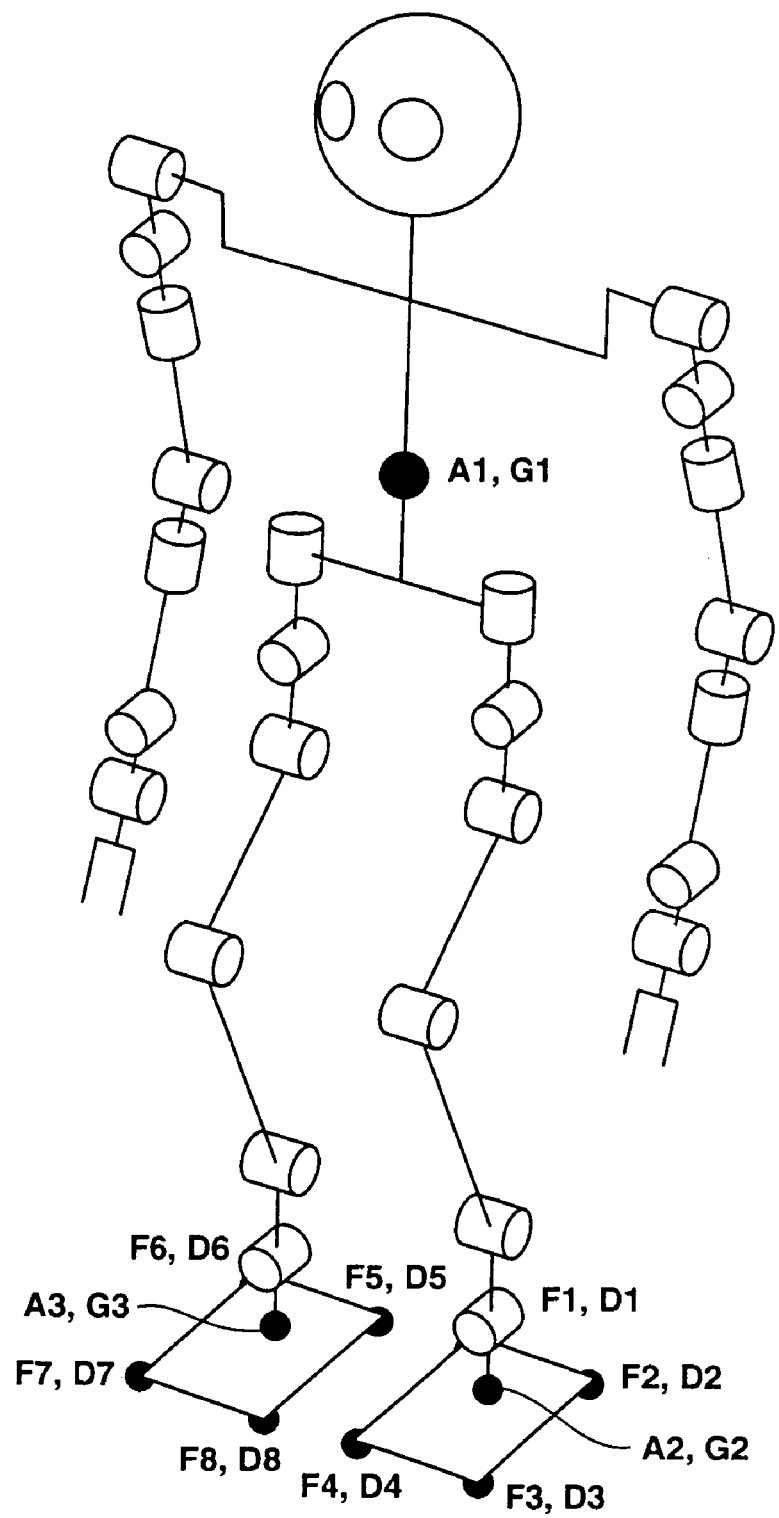
FIG. 3 schematically shows the structure of the degrees of freedom of a legged mobile robot 100 embodying the present invention.

FIG. 3 schematically shows the structure of the degrees of freedom of the legged mobile robot 100 embodying the present invention.

Referring to FIG. 3, the present robot is made up by a trunk part of the robot to which are mounted four limbs. These four limbs are formed by left and right arms having seven degrees of freedom, that is, a shoulder joint pitch axis, a shoulder joint roll axis, an upper arm yaw axis, an elbow joint pitch axis, a forearm yaw axis, a wrist roll axis and a wrist pitch axis, and by left and right legs having six degrees of freedom, that is, a hip joint yaw axis, a hip joint roll axis, a hip joint pitch axis, a knee joint pitch axis, an ankle pitch axis and an ankle roll axis.

In actuality, these degrees of freedom in the joints are implemented by actuator motors. In the present embodiment, there is mounted a small-sized direct gear coupling type AC servo actuator in which a servo control system is designed as one chip and enclosed in a motor unit. Meanwhile, this sort of the AC servo actuator is disclosed in e.g. the Japanese Laying-Open Patent Publication 2000-299970 (Japanese Patent Application H11-33386) transferred to the present Assignee.

The robot body is loaded with an acceleration sensor A1 and with a gyro G1. On the four corners of left and right foot soles, there are mounted uniaxial load cells F1 to F8 for detecting the force of reaction of the floor in a direction perpendicular to the foot sole surface, and infra-red distance measuring sensors D1 to D8 for measuring the distance to the floor surface. At a mid portion of each of the left and right foot soles, there are mounted acceleration sensors A2 and A3 and gyros G2, G3.

It is noted that the head unit has a degree of freedom of the joint about the neck joint yaw axis, first and second neck joint pitch axes and the neck joint roll axis, with respect to the body trunk part, although this is not shown in FIG. 3 for avoiding complexities in the drawings. The body trunk part also has a degree of freedom of the joint about each of the body trunk roll axis and the body trunk pitch axis.

B. Structure of the Control System for Legged Mobile Robot

Figure 4:
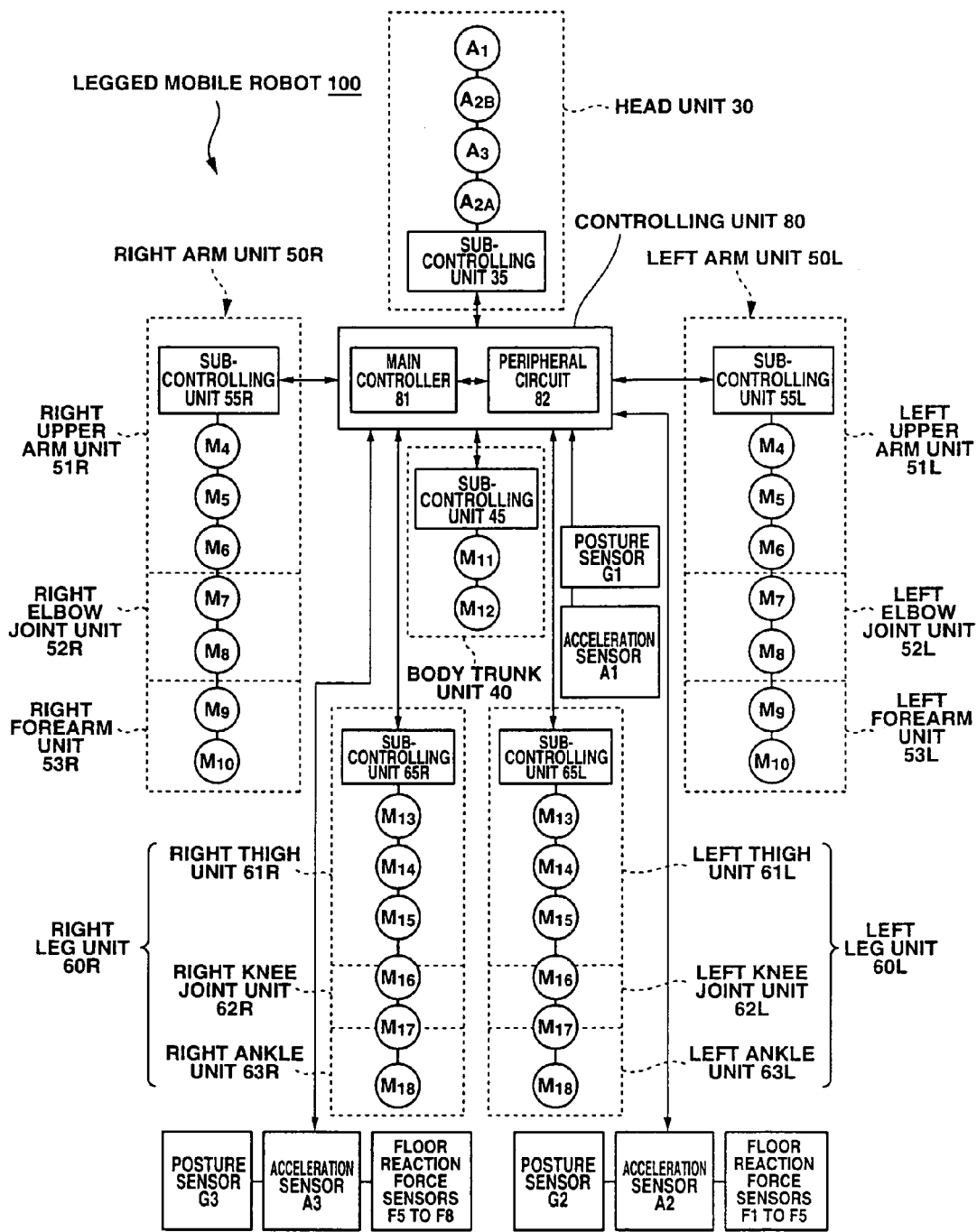
FIG. 4 schematically shows a control system structure of the legged mobile robot 100.

FIG. 4 schematically shows the structure of the control system of the legged mobile robot 100. In this figure, the legged mobile robot 100 is made up by respective mechanical units 30, 40, 50R/L and 60 R/L, representing four limbs of the human being, and a controlling unit 80 for exercising adaptive control for realizing concerted movements among the respective mechanical units. It is noted that, throughout the specification, R and L are each suffixes depicting right and left, respectively.

The overall movements of the legged mobile robot 100 are comprehensively controlled by the controlling unit 80. This controlling unit 80 is made up by a main controller 81 and a peripheral circuit 82. The main controller 81 is formed by main circuit components, composed e.g. of a CPU (central processing unit) and a memory, while the peripheral circuit 82 includes an interface, not shown, for exchanging data or commands with the power supply circuit or with respective component units of the robot 200.

In practicing the present invention, there is no particular limitation to the mounting site of the controlling unit 80. Although the controlling unit is mounted to the body trunk unit 40 in FIG. 4, it may also be mounted to the head unit 30. Or, the controlling unit 80 may be mounted externally of the legged mobile robot 100 and connected over a wired or wireless path to the body unit of the legged mobile robot 100 for communication.

The degree of freedom of each joint in the legged mobile robot 100 shown in FIG. 3 is realized by a relevant actuator motor M. That is, the head unit 30 is provided with a neck joint yaw axis actuator $M_1$, neck joint pitch axis actuators $M_{2A}$, an $M_{2B}$ and a neck joint roll actuator $M_3$, representing the neck joint yaw axis, first and second neck joint pitch axes and the neck joint roll axis, respectively.

The body trunk unit 40 is provided with a body trunk pitch axis actuator $M_{11}$ and a body trunk roll axis actuator $M_{12}$ representing the body trunk pitch axis and the body trunk roll axis, respectively.

The arm units 50R/L are subdivided into upper arm units 51R/L, elbow joint units 52R/L and forearm units 53R/L. It is noted that the arm units are each provided with a shoulder joint pitch axis actuator $M_4$, a shoulder joint roll axis actuator $M_5$, an upper arm yaw axis actuator $M_6$, an elbow joint pitch axis actuator $M_7$, an elbow joint yaw axis actuator $M_8$, a wrist joint roll axis actuator $M_9$ and a wrist joint pitch axis actuator $M_{10}$, representing a shoulder joint pitch axis, a shoulder joint roll axis, an upper arm yaw axis, an elbow joint pitch axis, an elbow joint roll axis, a wrist joint roll axis and a wrist joint pitch axis, respectively.

The leg units 60R/L are subdivided into thigh units 61R/L, knee units 62R/L and shank units 63R/L. It is noted that the leg units 60R/L are each provided with a hip joint yaw axis actuator $M_{13}$, a hip joint pitch axis actuator $M_{14}$, a hip joint roll axis actuator $M_{15}$, a knee joint pitch axis actuator $M_{16}$, an ankle joint pitch axis actuator $M_{17}$ and an ankle joint roll axis actuator $M_{18}$, representing the hip joint yaw axis, hip joint pitch axis, hip joint roll axis, knee joint pitch axis, ankle joint pitch axis and the ankle joint roll axis, respectively.

More preferably; the actuators $M_1, M_2, M_3, \ldots$, used for the respective joints, may each be constructed by a small-sized AC servo actuator, as described before, of the direct gear coupled type in which the servo control system is arranged as one chip and loaded in a motor unit.

The respective mechanical units of the head unit 30, body trunk unit 40, arm units 50 and the leg units 60 are provided with sub-controlling units 35, 45, 55, 65 for driving and controlling the actuators, respectively.

The body trunk unit 40 of the robot body is provided with an posture sensor G1 composed e.g. of an acceleration sensor A1 and a gyro sensor G1. The acceleration sensor A1 is arranged e.g. along X, Y and Z axes. By arranging the acceleration sensor A1 to the waist part of the robot body, it is possible to set the waist, representing the site with a large weight mass from the perspective of robot movement movements, as a control target point, and to directly measure the posture or the acceleration on this site, in order to exercise ZMP-based posture stabilizing control.

The leg units 60R, 60L are provided respectively with floor reaction sensors F1 to F4 and F5 to F8, acceleration sensors A2, A3, and with posture sensors G2, G3. The floor reaction sensors F1 to F8 may be constructed by pressure sensors mounted to e.g. foot soles. It can be detected, based on the presence or absence of the force of reaction exerted from the floor, whether or not the foot sole has touched the floor. The acceleration sensors A2, A3 are arranged at least along the X and Y axes, respectively. The equation of ZMP equilibrium may directly be set at the foot closest to the ZMP position by providing the acceleration sensors A2, A3 on the left and right leg units.

If the acceleration sensors are provided only to the waist part, representing the site with a large weight mass from the perspective of robot movement movements, solely the waist part is set as a control target point. In this case, the state of the foot sole has to be relatively calculated, on the basis of the results of the calculations of the control target point, such that (1) the condition that the road surface is not moved without dependency on which force or torque acts thereon; and (2) the condition that the frictional resistance against translational movement on the road surface is satisfactorily large such that no slip is produced need to be met, as a matter of premises, between the foot and the road surface.

In the present embodiment, a reaction sensor system for directly detecting the ZMP and the force is provided to the foot as the site of contact on the road surface, whilst a local coordinate used for control and an acceleration sensor for directly measuring the coordinate are provided to the foot sole. As a consequence, the equation of ZMP equilibrium may directly be set at the foot closest to the ZMP position, so that more strict posture stabilizing control not dependent on the above-mentioned premises may be achieved at a higher speed. The result is that stabilized walking (movement) of the robot body may be assured even on the road surface which may be moved under application of a force or a torque, such as gravel, on a thick-piled carpet or, on a tile used in a household where slip is likely to be produced because satisfactory frictional coefficients of translational movement cannot be assured.

The main controller 81 is able to dynamically correct the control target responsive to outputs of the sensors A1 to A3, G1 to G3 or F1 to F8. More specifically, the controlling unit 80 adaptively controls the sub-controlling units 35, 45, 55, 65 to realize a whole-body movement pattern of the legged mobile robot 100 in which the upper limbs, body trunk and the lower limbs are actuated in concert.

For realizing the whole-body movements of the robot body of the legged mobile robot 100, the movements of the foot units, ZMP (zero moment point) trajectory, body trunk movements, upper limb movements and the height of the waist part etc, are set, whilst commands for instructing the movements pursuant to the setting contents, are transmitted to the sub-controlling units 35, 45, 55, 65. The respective sub-controlling units 35, 45, . . . interpret the commands received from the controlling unit 80 from the main controller 81 to output driving control signals to the respective actuators $M_1, M_2, M_3, \ldots$. It should be noted that the [ZMP] denotes a point on the floor surface where the moment by the force of reaction from the floor during walking becomes zero, while the [ZMP trajectory] means, as aforesaid, the locus of movement along which the ZMP is moved during the walking period of the robot 100.

C. Motion Editing System

Figure 5:
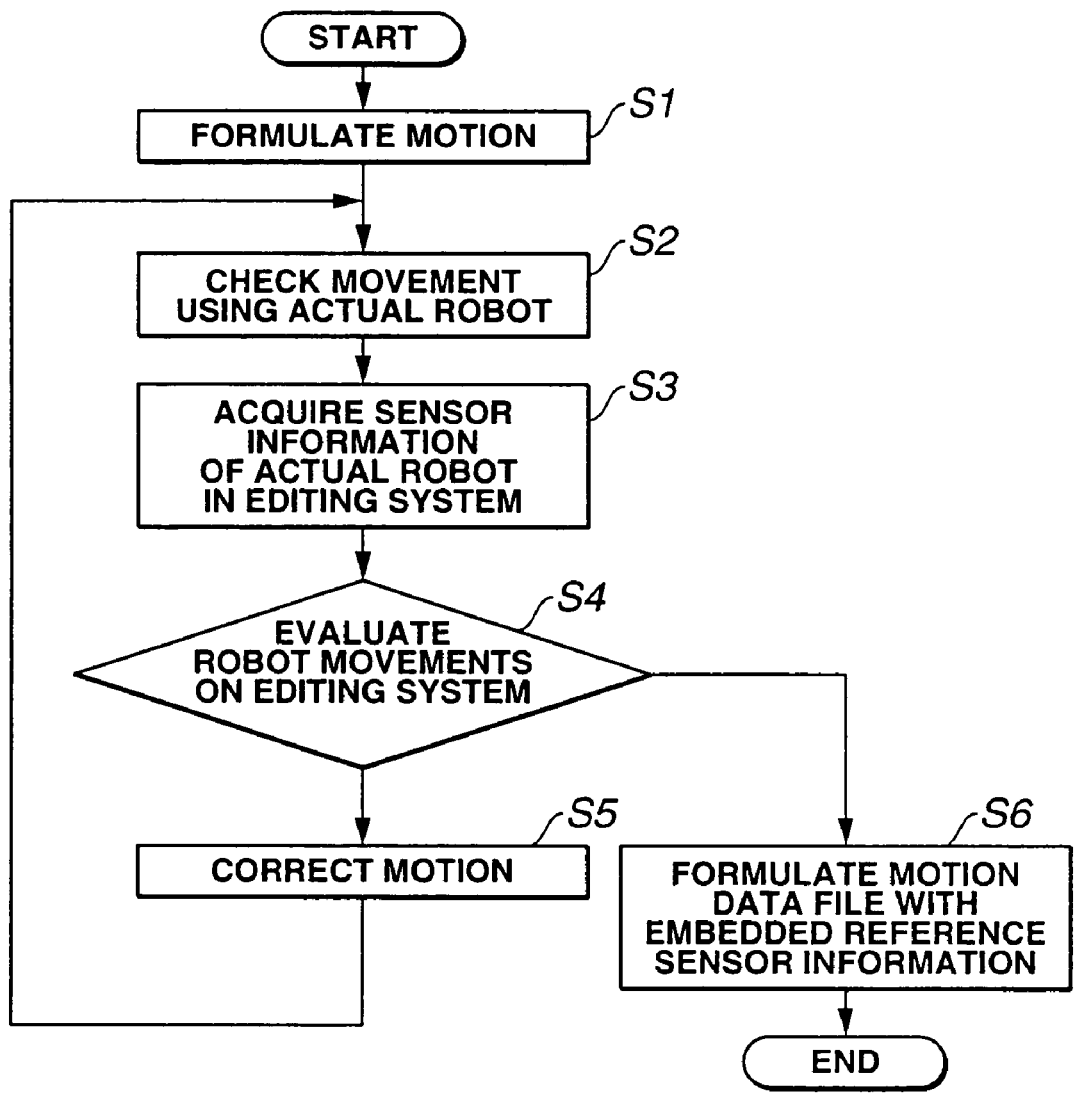
FIG. 5 schematically shows the processing flow in a motion editing system according to an embodiment of the present invention.

FIG. 5 schematically shows the processing flow in a motion editing system in an embodiment of the present invention.

The user first edits motion data for the legged mobile robot 100 off-line on a motion editing system, having a motion editing application installed thereon, such as a personal computer (step S1).

It should be noted that the motion data may be edited by chronologically combining two or more poses (postures) of the robot 100. The poses of the robot 100 can be stated by displacements of the respective angles of joints. On the other hand, the motion data may be formed by the displacements, velocity or the acceleration of the respective angles of joints. Meanwhile, the motion data itself may be edited with advantage by employing the movement editing apparatus described in for example the Japanese Patent Application 2000-73423 transferred to the present Assignee.

The so prepared motion data is then installed on the legged mobile robot 100 to check for robot movements using the actual apparatus (step S2). The motion data itself is the chronological data representing a continuum of movements, such as displacements and velocities of the respective angles of joints, and is sometimes voluminous. In the present embodiment, an optional range of the motion data is taken out and reproduced on the actual apparatus to improve the efficiency of the motion editing operation, as will be explained subsequently in detail.

Outputs from respective sensors mounted on the actual apparatus when the optional range of the motion data is reproduced using the actual apparatus are transmitted to the motion editing system (step S3). The sensor information herein includes the acceleration sensor A1 and the gyro sensor G1, mounted to the body trunk unit 40 (mounted approximately at the center of gravity of the robot body), the acceleration sensors A2 and A3, gyro sensors G2, G3 and floor reaction sensors F1 to F8, mounted to the left and right foot soles, in addition to rotation signals from the encoder mounted to the joint actuators.

The movements of the robot are then evaluated, on the motion editing system, based on the sensor information acquired during motion reproduction (step S4). The method of evaluation of the movements of the robot 100 based on the sensor information will be explained subsequently.

If, as a result of the robot movements, the preset evaluation criterium has not been met, the motion correcting processing is executed (step S5), after which processing reverts to the step S2 to re-evaluate the movements which are based on the reproduction on the actual apparatus.

If, as a result of the evaluation of the robot movements, the preset criterium has been met, a motion data file, in which the sensor information obtained in the step S3 is embedded as the reference sensor information, is prepared (step S6) to complete the present processing routine.

By evaluating and correcting the motion data in accordance with the processing sequence shown in FIG. 5, it is possible to acquire the sensor information of the actual robot by communication to prepare the motion which has taken the responses of the actual robot into account. It is also possible to check whether or not the actual robot is being operated, as scheduled, when the motion data prepared in a reference environment is run in a different environment, such as in a living environment.

Such evaluation of the motion data on the actual robot is mainly significant in the following points:

(1) Difference in the Impression of the Acceleration

Since the animation reproduction by computer graphics (CG) in a virtual space significantly differs from the reproduction on the actual apparatus in a real space, as to the sensitivity to the velocity or acceleration of the various components, it is necessary to use an actual robot for adjustment thereof.

(2) Difference in the Impression of the Posture

Since the animation reproduction by computer graphics (CG) in a virtual space significantly differs from the reproduction on the actual apparatus in a real space as to sensitivity to the positions and postures of the various components, it is necessary to use an actual robot for its adjustment. For example, when the site referred to for stabilization is limited to only the waist part, there are occasions where the waist movements, which were not objectionable as far as the computer graphics are concerned, are felt to be excessive in a check on reproduction on an actual apparatus, such that the desired dynamic posture is not achieved. The dynamic posture may be corrected to the desired dynamic posture by carrying out the partial reproduction as the number of the sites referred to for stabilization is increased and as the priority sequence is changed. For example, the body trunk and the head unit may be added to the waist part, as sites for reference for stabilization, whereby the waist movement of the actual robot may be diminished to achieve desired movements.

(3) Difficulties Met in Estimating the Actuator Torque (Current) on the Actual Apparatus For correct current estimation on the actual apparatus, it is necessary to construct the motor model extremely rigorously and to identify the respective elements extremely accurately. Moreover, the time needed in the simulation employing this model exceeds the practically tolerable level for a routine computer system, such as PC. Thus, by performing actual measurements by motion reproduction on the actual apparatus and by correcting details, it is possible to construct more robust motions without appreciably increasing the time needed in preparing the motion.

(4) Difficulties Met in Specifying Correct Contact and Touchdown Time

An offset from the scheduled movement of the contact point and the contact timing of the robot with an outside world leads to application to the robot of an unknown and impulse-like external force and an external force moment, so that, even if real-time adaptive control is applied, the effect such offset has on the stability of the robot movement may become significant. However, in constructing a rigorous shape model of an actual robot, high precision identification of various components of the shape model, inclusive of an external environment, is needed. Moreover, simulation of the contact state employing the model is not realistic because such simulation needs time appreciably surpassing the time actually tolerable with a routine computer system, such as PC. Thus, an extremely robust motion may be generated by again carrying out the motion correction and the processing for stabilizing the posture (movement) using an offset between the touchdown point and the states of touchdown and flight of the motion generated using a shape model and an environment model simplified to permit processing within a time tolerable for a routine PC on one hand and those of same motion executed in a set of actual standard environments on the other hand.

Even if the movements themselves of the robot stated by motion data remain the same, the sensor outputs differ in dependence on the external environment or on the movement environment. For example, if the walking pattern remains the same, the sensor output values differ when the robot is walking on a road presenting a gradient, on the labile road surface, such as on the gravel, or on the thick-piled carpet. The present embodiment is meritorious in that, by burying the reference sensor information in the motion data, it is possible to write motion data in keeping up with a specified movement environment or with the robot using configuration.

FIGS. 6 to 9 show typical file formats of the motion data. In the present embodiment, the motion data includes the information on the angles of joints, posture information, information on the ZMP trajectory, and the information on the contact of the foot sole with the floor surface. Referring to FIG. 6, the information on the angles of joints is the chronological data comprised of the displacements, arrayed chronologically, that is, every sampling interval of the joint actuators representing the degrees of freedom of the respective joints of the legged mobile robot 100 at the time of execution of the motions. The records at an interval of a sampling interval are formed by the combination of the angle command values and the measured angle values of the respective joints in executing the motions. In the above figures, R_joint name denotes the angle command value for the relevant actuator at the time of editing, while M_joint name denotes the measured value of the relevant actuator when the robot executes the motion.

Referring to FIG. 7, the posture information is the chronological data comprised of the information, arrayed chronologically, that is, every sampling interval of the posture sensors (gyro sensors) installed on the respective sites on the robot body of the legged mobile robot 100 at the time of the motion execution. The records at the respective sampling time points are constructed by the combination of the target values for the respective sensors, measured values at the time of motion edition and the measured values corresponding to filtered sensor outputs. In FIG. 7, R_sensor name denotes a target value of a relevant sensor at the time of editing, M_sensor name denotes a measured value in the relevant sensor at the time of executing the robot motion and F_sensor name denotes measured values corresponding to filtered sensor outputs at the time of the execution of the robot movements.

Referring to FIG. 8, the ZMP trajectory information is the chronological data comprised of ZMP positions of the legged mobile robot 100 at the time of motion execution, which are arrayed chronologically, that is, every sampling time interval. The records taken every sampling period are comprised of the combination of the target ZMP trajectory, at the time of editing, of the left and right foot soles, and the ZMP trajectory as corrected by stabilization control in motion execution. Referring to FIG. 8, the R_ZMP trajectory is the target ZMP trajectory at the time of editing, whilst M_ZMP trajectory denotes the ZMP trajectory as corrected by stabilization control at the time of the motion execution by the robot.

Referring to FIG. 9, the information on the foot sole touchdown is the chronological data comprised of measured values, arrayed chronologically, that is, every sampling time interval, of the respective floor reaction sensors mounted to the foot soles of the legged mobile robot 100, at the time of the motion execution. The records taken every sampling time interval are formed by the combination of the target values at the time of editing of the floor reaction sensors and the measured values thereof at the time of the motion execution. In FIG. 9, the R_touchdown information denotes the target value at the time of editing, whilst M_touchdown information denotes measured values at the time of motion execution.

Figure 10:
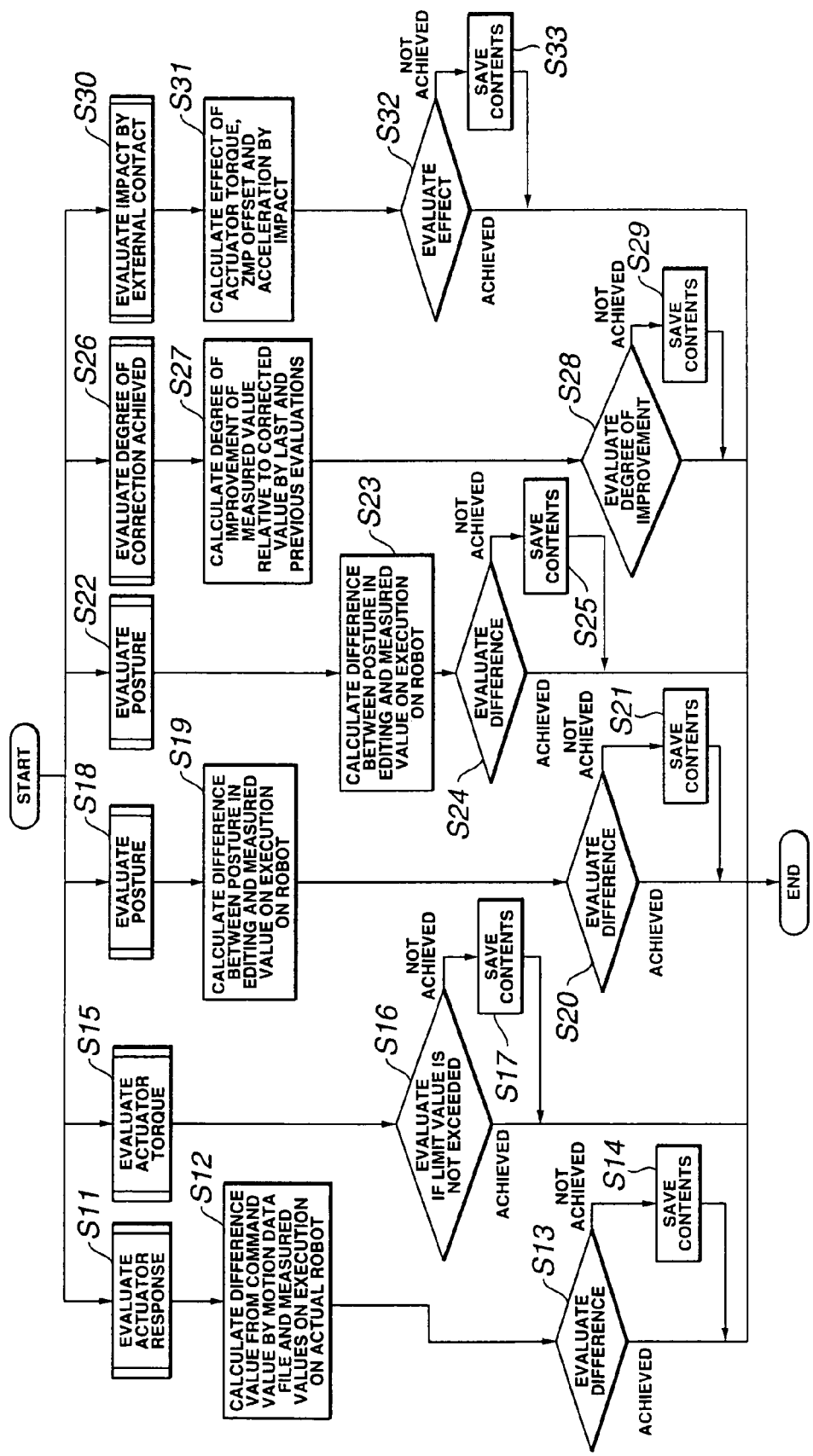
FIG. 10 is a flowchart showing a processing sequence for evaluating motion data of the robot 100 based on the sensor information.

FIG. 10 shows, in the form of a flowchart, the processing sequence in evaluating motion data of the robot 100, based on the sensor information. This processing sequence corresponds to step S4 of the flowchart of FIG. 5.

The step S11 evaluates response properties of the actuator. More specifically, this step S11 evaluates followup characteristics to the angle command value to the actuator at the time of editing, when the motion data is executed on the actual robot (step S12). The actuator is affected in response characteristics depending on the upper limit velocity (acceleration) and on the upper limit angle. Moreover, if the inter-link interference occurs, the actuator becomes unable to follow up with the target. The difference between the target value and the measured value is calculated (step S13) and, if the difference is increased, the result of the evaluation is degraded. If the evaluation is not satisfactory, the contents are saved (step S14) and, if the evaluation is satisfactory, the evaluation is terminated.

In a step S15, the actuator torque is evaluated. More specifically, the actuator torque value and the number of revolutions in case of execution on the actual robot are acquired chronologically. The so acquired data is compared to a NT curve representing actuator characteristics to verify whether or not there is any movement which has exceeded the limit torque of the actuator (step S16). If the result is unsatisfactory, the contents are saved (step S17). If the result is satisfactory, the evaluation is terminated. Although the calculations of the torque by simulation are extremely time-consuming and are not exempt from errors, the correct information can be acquired instantaneously by acquiring the torque values from the actual robot connected to the editing system.

In a step S18, the posture is evaluated. More specifically, the difference between the values of the posture sensor and the ZMP trajectory, as scheduled at the time of motion edition, on one hand, and the sensor values and the ZMP trajectory, executed on the actual robot, on the other hand, is calculated (step S19). If the difference is increased, the evaluation is degraded (step S20). If the evaluation has not yet been achieved, the contents are saved (step S21) and, if the evaluation has been achieved, the evaluation comes to a close. The so saved difference information is utilized as a parameter for posture stabilizing control at the time of re-editing.

In a step S22, the touchdown is evaluated. More specifically, the difference value between the posture at the time of motion editing and the measured values when the motion is executed on the actual robot is calculated (step S23) to evaluate the difference value (step S24). If the evaluation has not yet been achieved, the contents are saved (step S25) and, if the evaluation has been achieved, the evaluation comes to a close. An offset from the scheduled movement of the contact point and the contact timing of the robot with an outside world leads to application to the robot of unknown and impulse-like external force and the moment of the external force, so that, even if real-time adaptive control is applied, the effect such offset has on the stability of the robot movement is significant. However, an extremely robust motion may be generated by again carrying out the motion correction and the processing for stabilizing the posture (movement) using an offset between the touchdown point and the states of touchdown and flight, when the motion generated in an ideal virtual space is executed, on one hand, and those when the motion is executed on the actual robot, on the other hand.

In a step S26, the degree of achievement of the correction is evaluated. That is, the degree of the improvement of the measured values over the motion corrected by the evaluation of the last and previous evaluation events calculated (step S27) and comprehensive evaluation is again carried out in dependence on the falling priority sequence of the respective items (step S28). If the evaluation has not been achieved, the contents are saved (step S29) and, if the evaluation has been achieved, the evaluation is terminated.

In a step S30, impact evaluation by external contact is evaluated. More specifically, the effect of the impact on the actuator torque, ZMP offset and on the acceleration is calculated (step S31) to evaluate the effect (step S32). If the evaluation has not been achieved, the contents are saved (step S33) and, if the evaluation has been achieved, the evaluation is terminated. It is extremely difficult to model the outside world of the robot accurately, if in particular the human living environment is taken into account. Thus, a motion accompanied by collision against the outer object is first generated, in an ideal virtual space, using a simple collision model in which the run time by a simulator is not impracticably protracted. Then, using an offset from the force information on the occasion of contact with the outside object in case the motion is executed on the actual robot, the motion correction and the processing of stabilizing the posture (movements) are again performed to allow generation of an extremely robust motion in a short time.

Figure 11:
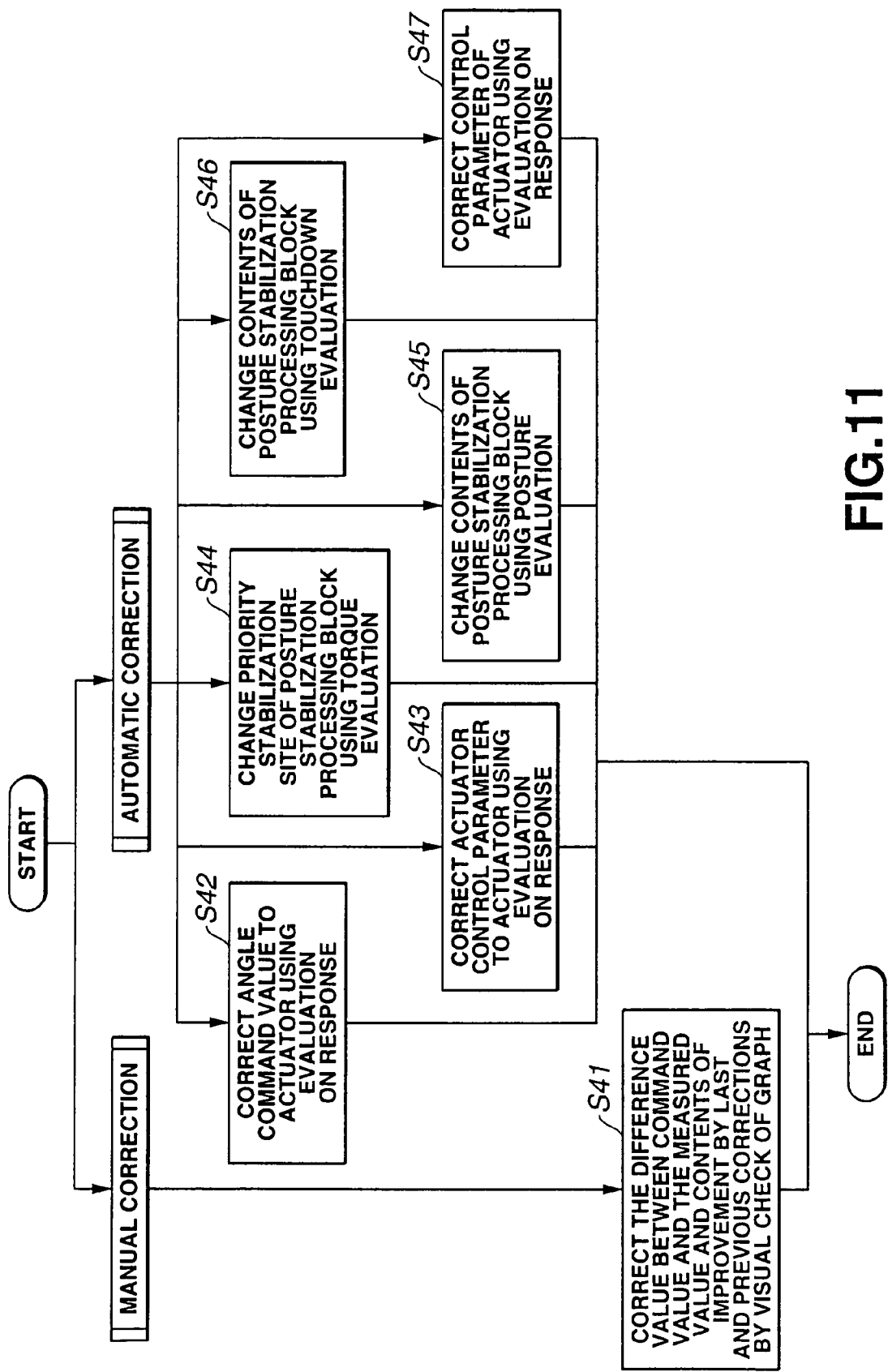
FIG. 11 is a flowchart showing a processing sequence for motion correction.

FIG. 11 shows, in the form of a flowchart, the sequence of movements for correcting the motion, which is equivalent to the step S5 in the flowchart shown in FIG. 5.

The motion correction may be executed manually or automatically on a motion editing system.

In the case of manual correction, the correction is carried out as the difference between the command value and the measured value and the improved contents by the last and previous corrections are visually checked by having reference to e.g. a graph in a step S41.

In the case of the automatic correction, an angle command value to the actuator is corrected, in a step S42, by exploiting the contents of the results of evaluation of the response characteristics in the step S11. The control parameter, such as PID, of the actuator is corrected, in a step S43, by exploiting the results of evaluation of the response characteristics. Also, the site of priority for stabilization of the posture stabilizing processing block is changed in a step S44 by exploiting the results of evaluation of the actuator torque in the step S15. Moreover, the contents of the posture stabilization processing block is changed in a step S45 by exploiting the results of evaluation of posture stabilization in the step S18. Also, the result of touchdown evaluation in the step S22 is used to change the contents of the posture stabilization block (step s46). Moreover, the control of the posture stabilization processing block, which takes contact with an outside object into account, is changed in a step Si, by exploiting the result of evaluation of the impact due to contact with the outside object in the step S30.

The motion editing processing of the present embodiment is featured by the fact that motion data may be reproduced and evaluated on the actual robot body, that the motion may be corrected on the basis of the sensor information acquired during reproduction of the motion data and that the motion data having the reference information embedded therein may be acquired as the processing results.

When the motion data is reproduced on the actual robot body, only an optional range of the motion data is taken out and reproduced on the actual robot body to improve the efficiency of the motion editing movement.

It is noted that a motion is composed of a chronological combination of two or more poses. If a dynamic motion exploiting positive continuous acceleration (continuous dynamic movement) is to be executed, it is impossible to execute the motion from an optional intermediate portion to make an evaluation.

In the present embodiment, such continuous dynamic movement is enabled to be reproduced as from an optional time point and such reproduction is also enabled to be halted as from an optional time point to reduce the time needed for motion evaluation appreciably.

Figure 12:
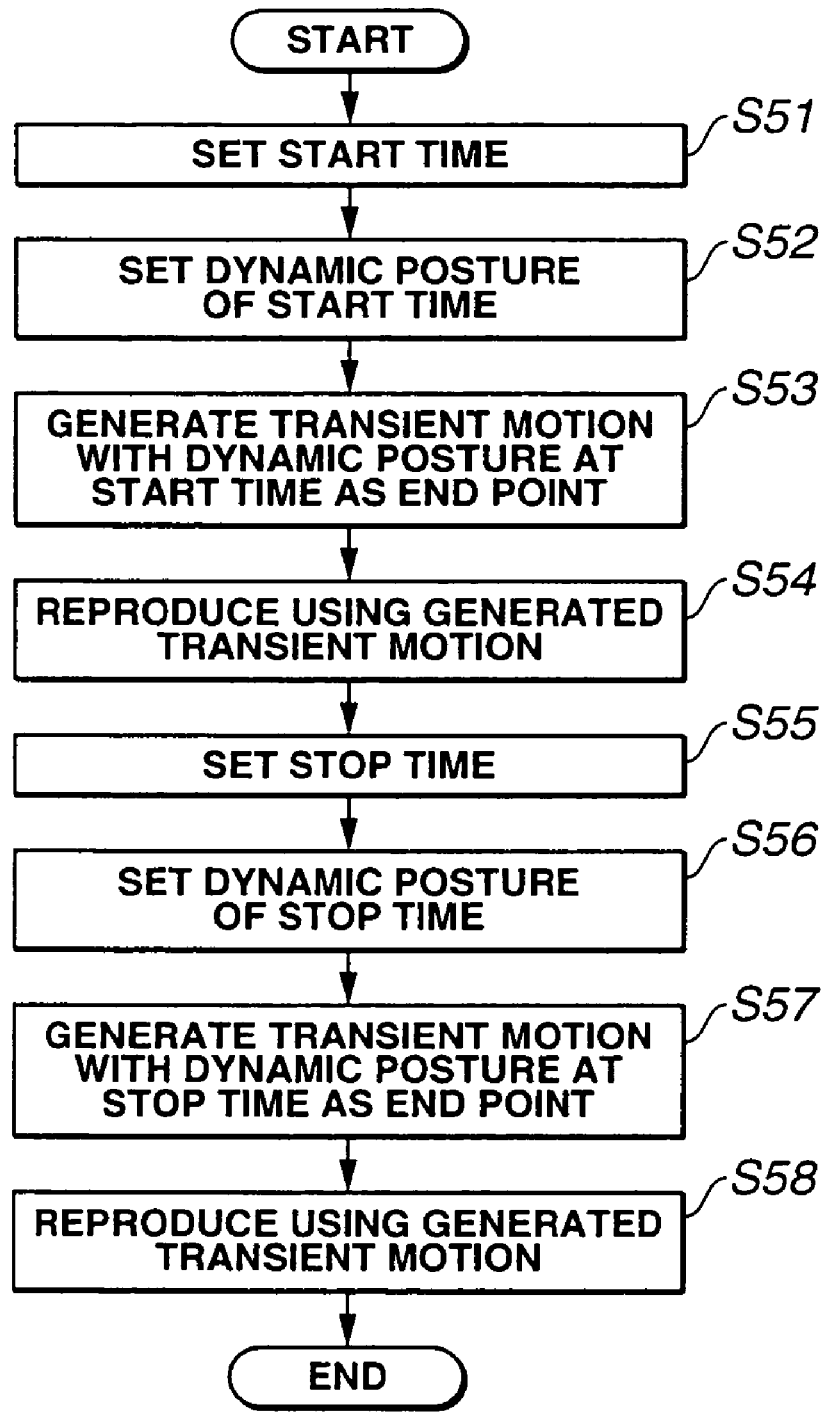
FIG. 12 is a flowchart showing a processing sequence for processing the reproduction and stop as from an optional time point of the continuous dynamic movements stated in motion data of the robot 100.

FIG. 12 shows, in the form of a flowchart, the sequence of movements for processing the reproduction and the halting of the reproduction as from an optional time point of the continuous dynamic movement stated by the motion data of the robot 100.

First, the start time point in the motion data is set by e.g. a user input (step S51).

Next, the dynamic posture at this start time point is calculated (step S52). The transient motion, having the dynamic posture at the start time point as a terminal point, is generated (step S53) and, using this transient motion, the motion on the actual robot is reproduced (step S54).

Then, by e.g. a user input, the stop time in the motion data is set (step S55). The dynamic posture at the stop time point is calculated (step S56) and the transient motion having the stop posture as a start point is generated (step S57) and, using this transient motion, the movement of the actual robot is halted (step S58).

Figure 13:
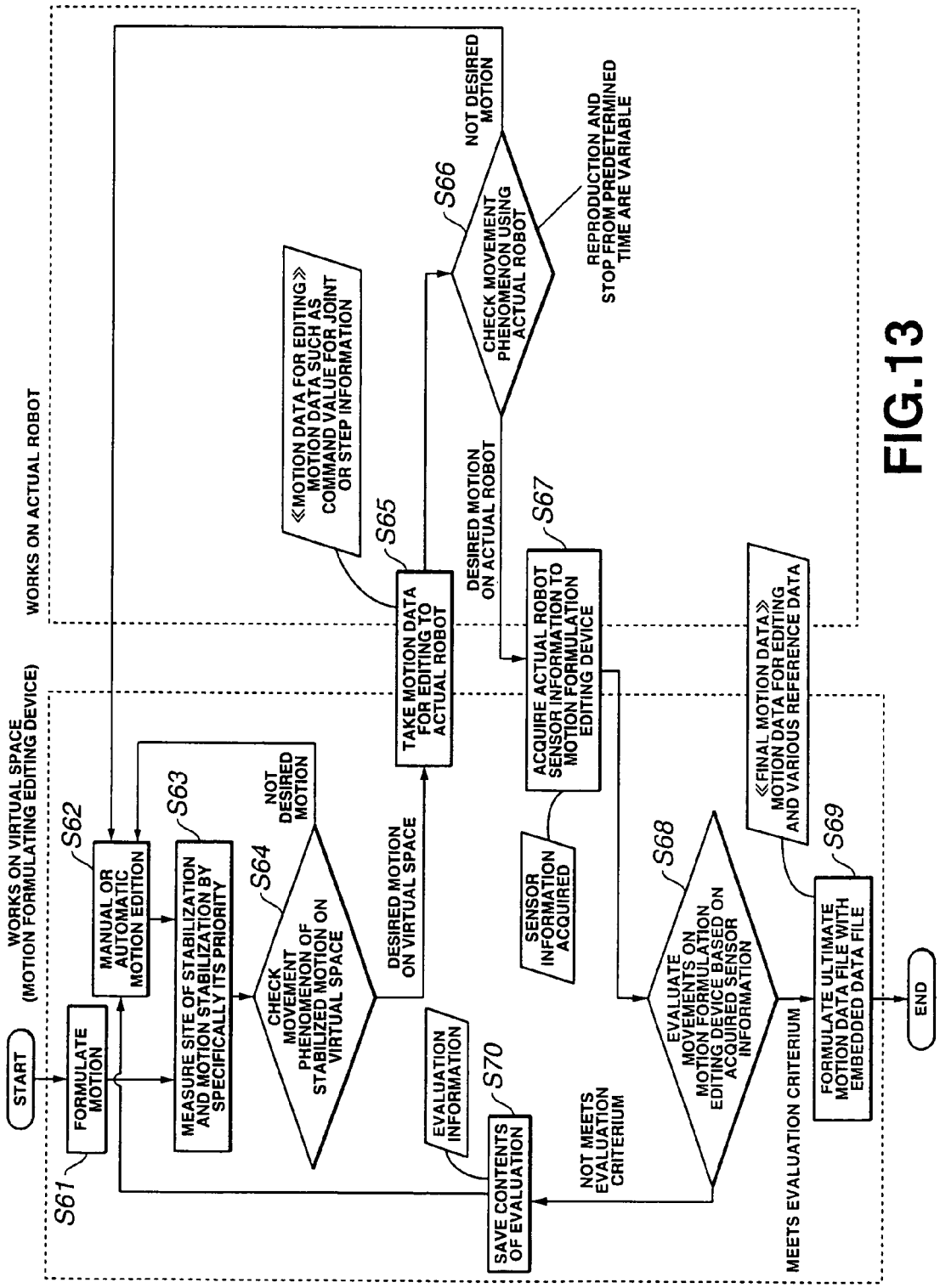
FIG. 13 is a flowchart showing a modification of the motion editing processing.

FIG. 13 shows, in the form of a flowchart, a modification pertinent to motion editing processing.

First, motion data is formulated on the motion formulation editing system (step S61).

In re-editing the motion, the motion data is re-edited manually or automatically in accordance with the processing sequence described above with reference to FIG. 11 (step S62).

The sites for stabilization on the virtual space are then selected and the priority sequence of the selected sites is specified in order to stabilize the motion (step S63).

The movement impression of the stabilized motion is checked on the motion formulation editing system (step S64). If the motion is the desirable motion, processing transfers to a step S65 and, if otherwise, processing reverts to the step S62.

In the step S65, the motion data for editing is a taken into the actual robot. In a step S66, the actual robot is used to check the impression of the movement.

It should be noted that the motion may be reproduced in its entirety or only partially subject to designation of partial reproduction. If the motion is a desired one, processing transfers to a step S67. If the motion is not the desired one, processing reverts to the step S62 for re-selection of the site for stabilization, re-designation of the priority sequence and for motion re-edition.

In the step S67, the sensor information of the actual robot is taken into the motion formulation editing device.

The movements of the robot are evaluated on the motion formulation editing apparatus in accordance with the processing sequence described above with reference to FIG. 10 in a step S68. If the criterium for evaluation has been met, processing transfers to a step S69 and, if otherwise, processing transfers to a step S70.

In the step S69, a final motion data file, composed of the motion data for editing and the reference data file, embedded therein, is formulated (see FIGS. 6 to 9).

In the step S70, the contents of the evaluation are saved. These saved contents are utilized in the motion re-editing (see FIGS. 6 to 9).

The present invention has so far been elucidated with reference to certain specific embodiments thereof. However, as may be apparent to those skilled in the art, various changes, substitutions or equivalents may be envisaged without departing from the scope and the purport of the invention as defined in the appended claims. The purport of the present invention is not necessarily limited to a product termed a "robot". That is, the present invention may be applied to any mechanical apparatus performing movements similar to those of the human being, based on electrical or magnetic actions, even though the apparatus belongs to other field of the industry, such as toys.

In sum, the present invention has been disclosed by way of illustration and the contents of the description of the present specification is not to be construed in a limiting sense. For understanding the purport of the present invention, reference is to be made to the description of the appended claims.

What is claimed is:

1. A motion editing apparatus for a legged mobile robot having a plurality of degrees of freedom in joints, and a sensor for measuring an external environment, comprising:
 a data inputting unit for inputting motion data;
 a data reproducing unit for reproducing said motion data on an actual apparatus;
 a sensor information acquisition unit for acquiring sensor information from said sensor during the time when said motion data is being reproduced,
 wherein the sensor information includes information on the angles of joints, posture information, information on a ZMP trajectory, and information on contact of a foot with a floor surface;
 a motion evaluation unit for evaluating the motion based on the acquired sensor information; and
 a motion correction unit for correcting the motion data based on said results of evaluation.

2. The motion editing apparatus for the legged mobile robot according to claim 1 further comprising:
 a motion data outputting unit for embedding the sensor information, acquired by said sensor information acquisition unit, in the motion data satisfying a criterium of evaluation in said motion evaluation unit, as reference data, and for outputting the resulting motion data having the reference data embedded therein.

3. The motion editing apparatus for the legged mobile robot according to claim 2 wherein said motion data outputting unit outputs the information on the angles of joints, formed by the combination of angle command values for respective joints and measured values acquired on executing the motion, as the motion data having the reference data embedded therein.

4. The motion editing apparatus for the legged mobile robot according to claim 2 wherein said motion data outputting unit outputs the posture information composed of the combination of the target values for the respective sensors at the time of motion edition, measured values of sensor outputs at the time of motion execution and filtered values of said measured values of the sensor outputs, as the motion data having the reference data embedded therein.

5. The motion editing apparatus for the legged mobile robot according to claim 2 wherein said motion data outputting unit outputs the ZMP trajectory information formed by the combination of the target ZMP trajectory for left and right foot soles at the time of editing and the ZMP trajectory as corrected by stabilization control at the time of execution of the motion, as the motion data having the reference data embedded therein.

6. The motion editing apparatus for the legged mobile robot according to claim 2 wherein said motion data outputting unit outputs the foot sole touchdown information and/or the contact information formed by the combination of a target value at the time of editing of an output of a floor reaction force sensor and a measured value thereof at the time of motion execution as motion data having the reference data embedded therein.

7. The motion editing apparatus for the legged mobile robot according to claim 1 wherein said motion evaluation unit chronologically evaluates followup characteristics on executing the motion on the actual apparatus.

8. The motion editing apparatus for the legged mobile robot according to claim 1 wherein said motion evaluation unit chronologically acquires a torque value of an actuator and the number of revolutions on executing the motion on an actual robot body and compares the acquired data to a NT curve representing the actuator characteristics of to evaluate whether or not there is any movement which surpasses the limit torque of the actuator.

9. The motion editing apparatus for the legged mobile robot according to claim 1 wherein said motion evaluation unit calculates a difference between posture sensor values and the ZMP trajectory as scheduled at the time of the motion edition, and sensor values and the ZMP trajectory as acquired on executing the motion on an actual robot body to evaluate the posture.

10. The motion editing apparatus for the legged mobile robot according to claim 1 wherein said motion evaluation unit calculates a difference between the posture at the time of motion edition and measured values obtained on executing the motion on the actual robot body to evaluate the touchdown and/or contact.

11. The motion editing apparatus for the legged mobile robot according to claim 1 wherein said motion evaluation unit calculates the degree of improvement in measured values as to the motion corrected by last and previous evaluation events to evaluate the degree of achievement of correction.

12. The motion editing apparatus for the legged mobile robot according to claim 1 wherein said motion evaluation unit calculates the effect of an impact due to contact with an outside object on an actuator torque, ZMP trajectory or on the acceleration to evaluate the impact due to contact with the outside object.

13. The motion editing apparatus for the legged mobile robot according to claim 1 wherein said motion correction unit corrects a command angle value to the actuator and/or corrects control parameters of the actuator based on the result of evaluation of response properties of the actuator.

14. The motion editing apparatus for the legged mobile robot according to claim 1 wherein said motion correction unit changes the contents of the posture stabilization processing block based on the result of evaluation of the actuator torque.

15. The motion editing apparatus for the legged mobile robot according to claim 1 wherein said motion correction unit changes the contents of the posture stabilization processing block based on the result of evaluation of the touchdown and/or contact.

16. The motion editing apparatus for the legged mobile robot according to claim 1 wherein said motion correction unit changes the control of said posture stabilization processing block, as the contact with the outside object is taken into account, based on the result of evaluation of the impact due to contact with the outside object.

17. The motion editing apparatus for the legged mobile robot according to claim 1 wherein said motion reproducing unit takes out only an optional range of motion data to reproduce the range thus taken out on the actual apparatus.

18. The motion editing apparatus for the legged mobile robot according to claim 17 wherein said data reproducing unit sets a start time point in motion data, calculates the dynamic posture at said start time point, generates a transient motion with the dynamic posture at said start time point as a terminal point, and reproduces the motion on said actual apparatus using said transient motion; and wherein said data reproducing unit also sets a stop time point in said motion data, calculates the dynamic posture at said stop time point, generates a transient motion with said stop posture as a start point and halts the movement of said actual apparatus using said transient motion.

19. A motion editing method for a legged mobile robot having a plurality of degrees of freedom in joints and a sensor for measuring an external environment, said method comprising:

a data inputting step of inputting motion data;

a data reproducing step of reproducing said motion data on an actual apparatus;

a sensor information acquisition step for acquiring sensor information from said sensor during the time when said motion data is being reproduced, wherein the sensor information includes information on the angles of joints, posture information, information on a ZMP trajectory, and information on contact of a foot with a floor surface;

a motion evaluation step of evaluating the motion based on the acquired sensor information; and a motion correction step of correcting the motion data based on said results of evaluation.

20. The motion editing method for the legged mobile robot according to claim 19 further comprising:

a motion data outputting step of embedding the sensor information acquired by said sensor information acquisition step in the motion data satisfying a criterium of evaluation in said motion evaluation step, as reference data, and for outputting the resulting motion data having the reference data embedded therein.

21. The motion editing method for the legged mobile robot according to claim 20 wherein said motion data outputting step outputs the information on the angles of joints, formed by the combination of angle command values for respective joints and measured values acquired on executing the motion, as the motion data having the reference data embedded therein.

22. The motion editing method for the legged mobile robot according to claim 20 wherein said motion data outputting step outputs the posture information composed of the combination of the target values for the respective sensors at the time of motion edition, measured values at the time of motion execution and filtered values of said measured values of the sensor outputs as the motion data having the reference data embedded therein.

23. The motion editing method for the legged mobile robot according to claim 20 wherein said motion data outputting step outputs the ZMP trajectory information formed by the combination of the target ZMP trajectory for left and right foot soles at the time of editing and the ZMP trajectory following the correction by stabilization control at the time of execution of the motion as the motion data having the reference data embedded therein.

24. The motion editing method for the legged mobile robot according to claim 20 wherein said motion data outputting step outputs the foot sole touchdown information and/or the contact information formed by the combination of a target value at the time of editing of a floor reaction sensor and a measured value thereof at the time of motion execution as motion data having the reference data embedded therein.

25. The motion editing method for the legged mobile robot according to claim 19 wherein said motion evaluation step chronologically evaluates followup characteristics on executing the motion on the actual apparatus.

26. The motion editing method for the legged mobile robot according to claim 19 wherein said motion evaluation step chronologically acquires a torque value of an actuator and the number of revolutions on executing the motion on an actual robot body and compares the acquired data to a NT curve representing the actuator characteristics to evaluate whether or not there is any movement which surpasses the limit torque of the actuator.

27. The motion editing method for the legged mobile robot according to claim 19 wherein said motion evaluation step calculates a difference between posture sensor values and the ZMP trajectory as scheduled at the time of the motion edition, and sensor values and the ZMP trajectory as acquired on executing the motion on an actual robot body to evaluate the posture.

28. The motion editing method for the legged mobile robot according to claim 19 wherein said motion evaluation step calculates a difference between the posture at the time of motion edition and measured values obtained on executing the motion on the actual robot body to evaluate the touchdown and/or contact.

29. The motion editing method for the legged mobile robot according to claim 19 wherein said motion evaluation step calculates the degree of improvement in measured values as to the motion corrected by last and previous evaluation events to evaluate the degree of achievement of correction.

30. The motion editing method for the legged mobile robot according to claim 19 wherein said motion evaluation step calculates the effect of an impact due to contact with an outside object on an actuator torque, ZMP trajectory or on the acceleration to evaluate the impact due to contact with the outside object.

31. The motion editing method for the legged mobile robot according to claim 19 wherein said motion correction step corrects a command angle value to the actuator and/or corrects control parameters of the actuator based on the result of evaluation of response properties of the actuator.

32. The motion editing method for the legged mobile robot according to claim 19 wherein said motion correction step changes the contents of the posture stabilization processing block based on the result of evaluation of the actuator torque.

33. The motion editing method for the legged mobile robot according to claim 19 wherein said motion correction step changes the contents of the posture stabilization processing block based on the result of evaluation of the touchdown and/or contact.

34. The motion editing method for the legged mobile robot according to claim 19 wherein said motion correction step changes the control of said posture stabilization processing block, as the contact with the outside object is taken into account, based on the result of evaluation of the impact due to contact with the outside object.

35. The motion editing method for the legged mobile robot according to claim 19 wherein said motion reproducing step takes out only an optional range of motion data to reproduce the range thus taken out on the actual apparatus.

36. The motion editing method for the legged mobile robot according to claim 35 wherein said data reproducing step sets a start time point in motion data, calculates the dynamic posture at said start time point, generates a transient motion with the dynamic posture at said start time point as a terminal point, and reproduces the motion on said actual apparatus using said transient motion; and wherein said data reproducing step also sets a stop time point in said motion data, calculates the dynamic posture at said stop time point, generates a transient motion with said stop posture as a start point and halts the movement of said actual apparatus using said transient motion.

37. A computer program stored on a computer-readable medium including a motion editing program for a legged mobile robot having a plurality of degrees of freedom in joints and a sensor for measuring an external environment, said computer program comprising:

a data inputting step of inputting motion data;

a data reproducing step of reproducing said motion data on an actual apparatus;

a sensor information acquisition step of acquiring sensor information from said sensor during the time when said motion data is being reproduced, wherein the sensor information includes information on the angles of joints, posture information, information on a ZMP trajectory, and information on contact of a foot with a floor surface;

a motion evaluation step of evaluating the motion based on the acquired sensor information; and a motion correction step of correcting the motion data based on said results of evaluation.

* * * * *